United States Patent [19]

Sanders

[11] Patent Number: 5,123,130
[45] Date of Patent: Jun. 23, 1992

[54] ILLUMINATED COMMODE TRAINING KIT

[76] Inventor: James M. Sanders, 6730 Granner Cir., Indianapolis, Ind. 46241

[21] Appl. No.: 560,559

[22] Filed: Jul. 30, 1990

[51] Int. Cl.$^5$ ............................................. A47K 17/00
[52] U.S. Cl. ........................................ 4/661; 4/234; 4/237; 4/902; 4/DIG. 6; 4/242.1
[58] Field of Search ............. 4/661, 251, 233, DIG. 6, 4/234, 235, 237, 242, 251

[56] References Cited
U.S. PATENT DOCUMENTS

| | | | |
|---|---|---|---|
| 2,341,583 | 2/1944 | Tuve | 250/462.1 |
| 2,460,543 | 2/1949 | Spierer | 4/233 |
| 2,514,612 | 7/1950 | Snow | 250/462.1 X |
| 2,542,894 | 2/1951 | Blanchard | 250/462.1 |
| 4,401,050 | 8/1983 | Britt et al. | 250/462.1 X |
| 4,875,251 | 10/1989 | Hazard | 4/251 |
| 4,935,632 | 6/1990 | Hant | 250/462.1 X |

Primary Examiner—Henry K. Artis

[57] ABSTRACT

An organization is set forth including a series of components including a ring member for securement to and about a commode seat, a frame member for adherably mounting about a tissue roll dispenser, and a plurality of elongate longitudinally aligned mat members of flexible construction, wherein the components include illumination with characteristics to provide directional training to a child and the like for proper use of a commod during limited light conditions. The organization may include luminescent layers to provide visual observation to the components or alternatively utilize a fiber optic cable network directed therethrough to provide continuous, as well as selective, illumination of the components.

7 Claims, 5 Drawing Sheets

PRIOR ART

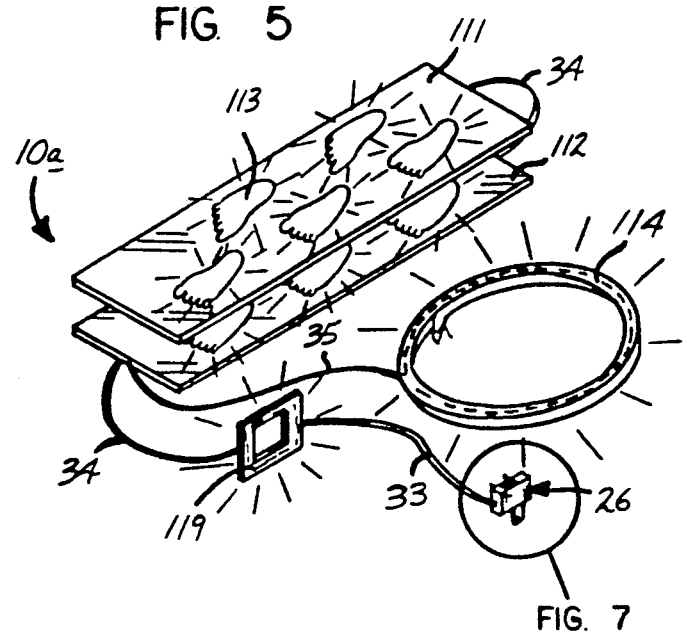
FIG. 5
FIG. 7
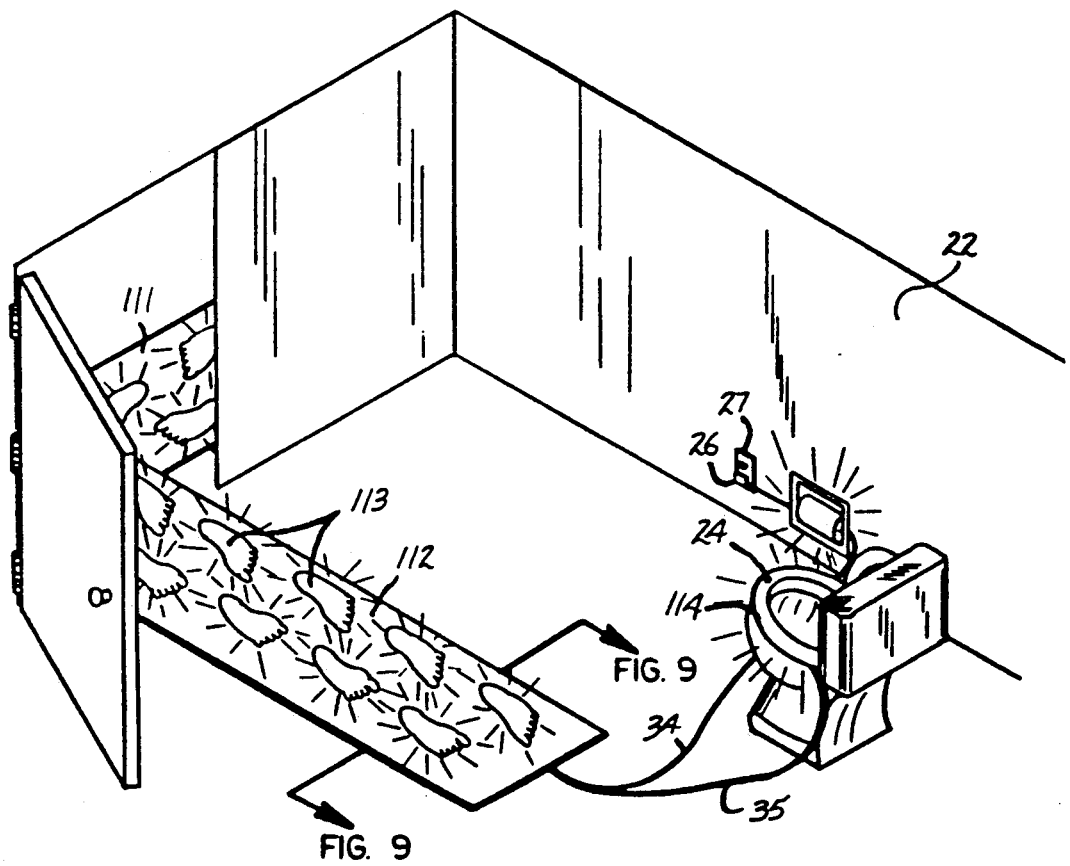
FIG. 6

ILLUMINATED COMMODE TRAINING KIT

BACKGROUND OF THE INVENTION

1. Field of the Invention

The field of invention relates to commode training apparatus, and more particularly pertains to a new and improved illuminated commode training kit to enhance training of a child in proper commode usage, particularly during conditions of limited light.

2. Description of the Prior Art

Proper commode training of a child is frequently a challenging, if not frustrating, experience universally encountered by parents or guardians of the child. To enhance ease of such training, as well as introducing the component of entertainment, the instant invention sets forth components for use relative to one another to emphasize various characteristics of commode usage. Prior art illuminated commode components have been available and exemplified by U.S. Pat. No. 4,860,178 to Picon setting forth a commode light member mounted to a bottom surface of a commode lid for selective or automatic illumination upon positioning of a lid relative to an associated commode.

U.S. Pat. No. 3,982,288 to Borne sets forth a commode seat utilizing a fiber optic component mounted within the commode seat.

U.S. Pat. No. 2,616,097 to Smith provides for use of sanitizing of a toilet seat by ultraviolet light upon manipulation of the seat.

U.S. Pat. No. 2,460,543 to Spierer sets forth an ultraviolet toilet seat or arrangement provided for selective illumination and sanitizing of the toilet seat.

U.S. Pat. No. 4,413,364 to Bittaker provides for a commode light unit controlled by a gravity actuated mercury switch on the toilet seat for selective illumination.

As such, it may be appreciated that there continues to be a need for a new and improved illuminated commode training kit organization which addresses both the problems of ease of use as well as effectiveness in construction and application and in this respect, the present invention substantially fulfills this need.

SUMMARY OF THE INVENTION

In view of the foregoing disadvantages inherent in the known types of commode apparatus now present in the prior art, the present invention provides an illuminated commode training kit wherein the same provides an organization synergistically cooperative to enhance ease of training of a child and the like in proper commode usage. As such, the general purpose of the present invention, which will be described subsequently in greater detail, is to provide a new and improved illuminated commode training kit which has all the advantages of the prior art commode apparatus and none of the disadvantages.

To attain this, the present invention provides an organization setting forth a series of components including a ring member for securement to and about a commode seat, a frame member for adherably mounting about a tissue roll dispenser, and a plurality of elongate longitudinally aligned mat members of flexible construction, wherein the components include illumination with characteristics to provide directional training to a child and the like for proper use of a commode during limited light conditions. The organization may include luminescent layers to provide visual observation to the components or alternatively utilize a fiber optic cable network directed therethrough to provide continuous, as well as selective, illumination of the components.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminated commode training kit which has all the advantages of the prior art commode apparatus and none of the disadvantages.

It is another object of the present invention to provide a new and improved illuminated commode training kit which may be easily and efficiently manufactured and marketed.

It is a further object of the present invention to provide a new and improved illuminated commode training kit which is of a durable and reliable construction.

An even further object of the present invention is to provide a new and improved illuminated commode training kit which is susceptible of a low cost of manufacture with regard to both materials and labor, and which accordingly is then susceptible of low prices of sale to the consuming public, thereby making such illuminated commode training kits economically available to the buying public.

Still yet another object of the present invention is to provide a new and improved illuminated commode training kit which provides in the apparatuses and methods of the prior art some of the advantages thereof, while simultaneously overcoming some of the disadvantages normally associated therewith.

Still another object of the present invention is to provide a new and improved illuminated commode training kit wherein the same provides for guidance to and illumination about a commode apparatus for training of a child in its proper usage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of modified components utilized by the instant invention.

FIG. 6 is an isometric illustration of the modified components as set forth in FIG. 5 in a lavatory environment.

DESCRIPTION OF THE PREFERRED EMBODIMENT

Figure 1:
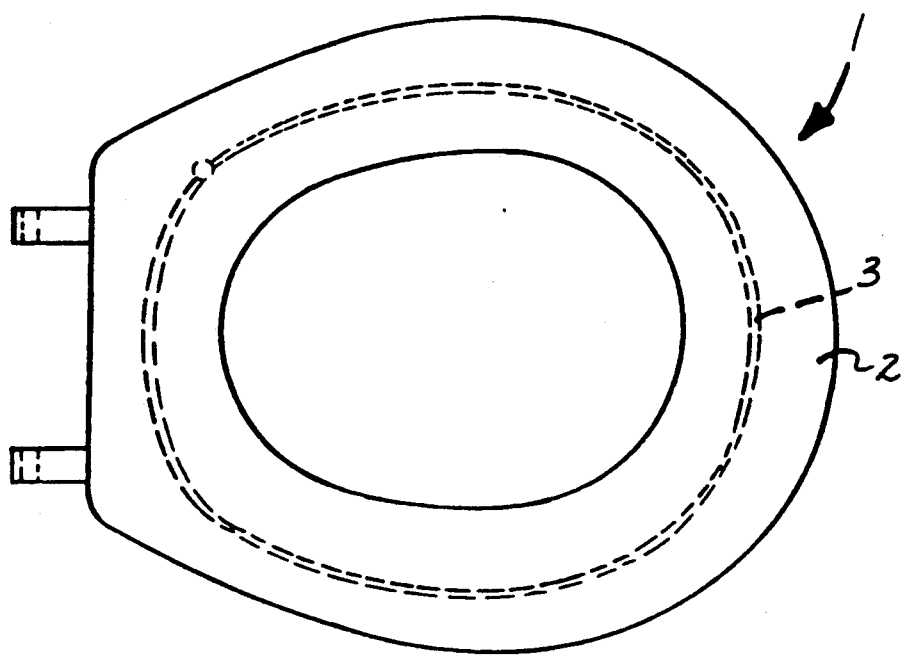
FIG. 1 is a top orthographic view of a prior art illuminated commode seat organization.

With reference now to the drawings, and in particular to FIGS. 1 to 10 thereof, a new and improved illuminated commode training kit embodying the principles and concepts of the present invention and generally designated by the reference numerals 10 and 10a will be described.

Figure 2:
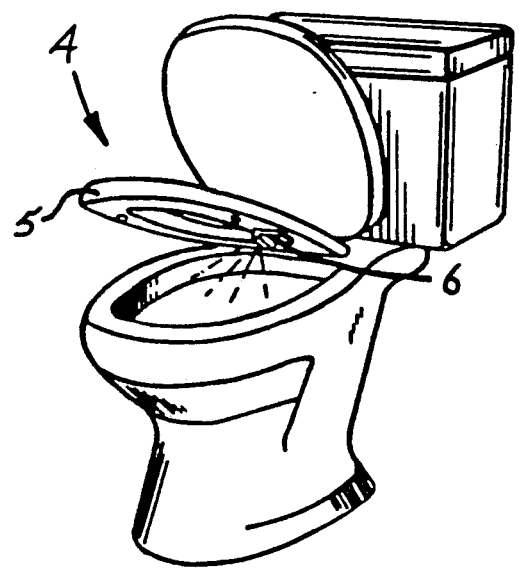
FIG. 2 is an isometric illustration of a further prior art illuminated seat structure for use with a commode.
Figure 3:
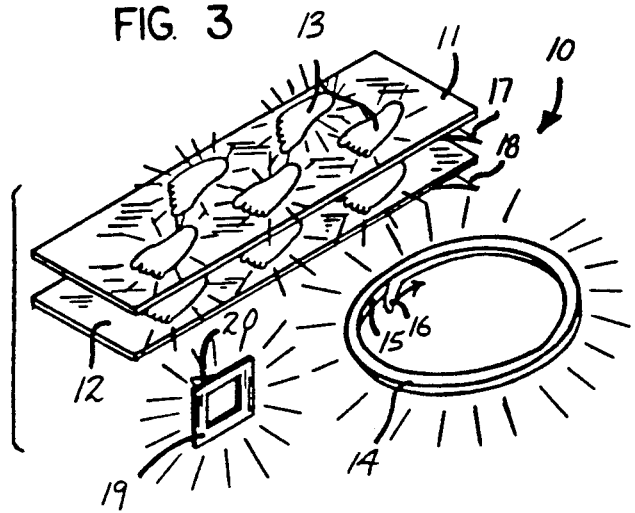
FIG. 3 is an isometric illustration of various components utilized by the instant invention.

FIG. 1 illustrates a prior art commode apparatus 1, wherein a commode seat 2 includes illuminated cable 3 imbedded and mounted therewithin. FIG. 2 illustrates a further prior art commode apparatus 4, wherein the commode lid includes illumination member 6 arranged for actuation upon positioning the seat upon the associated commode in a generally horizontal orientation, or alternatively by a manually actuated switch.

Figure 4:
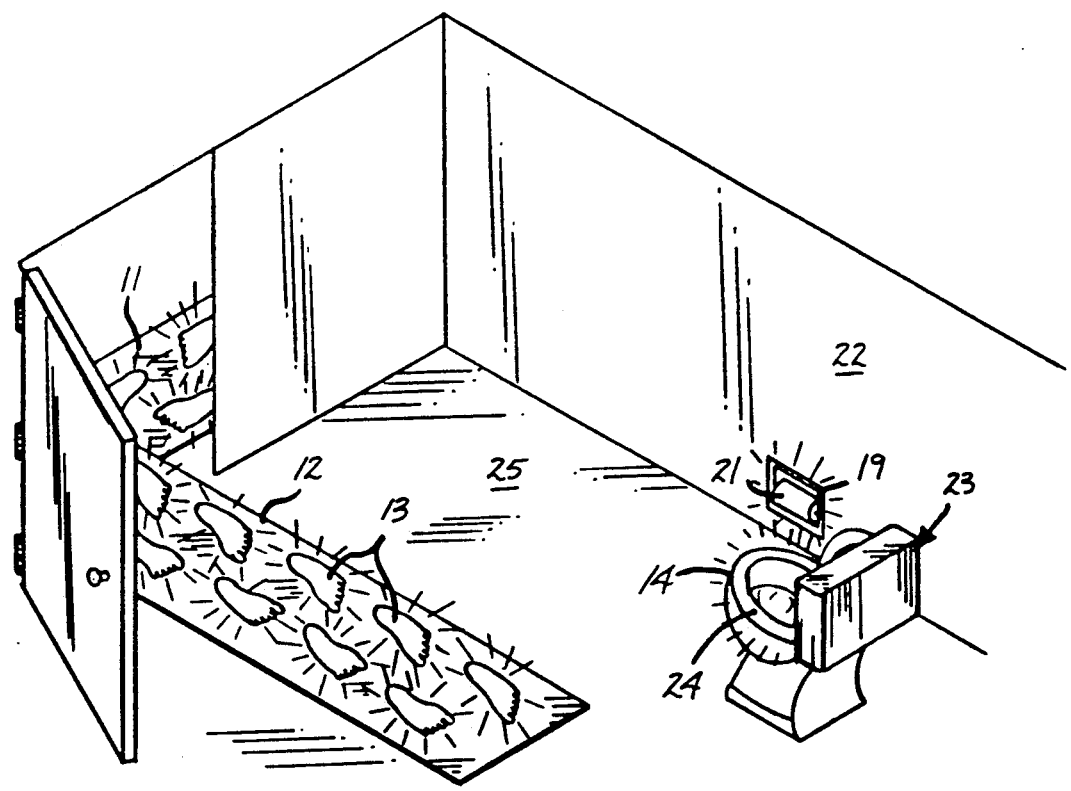
FIG. 4 is an isometric illustration of the various components of the instant invention mounted within a lavatory environment.
Figure 7:
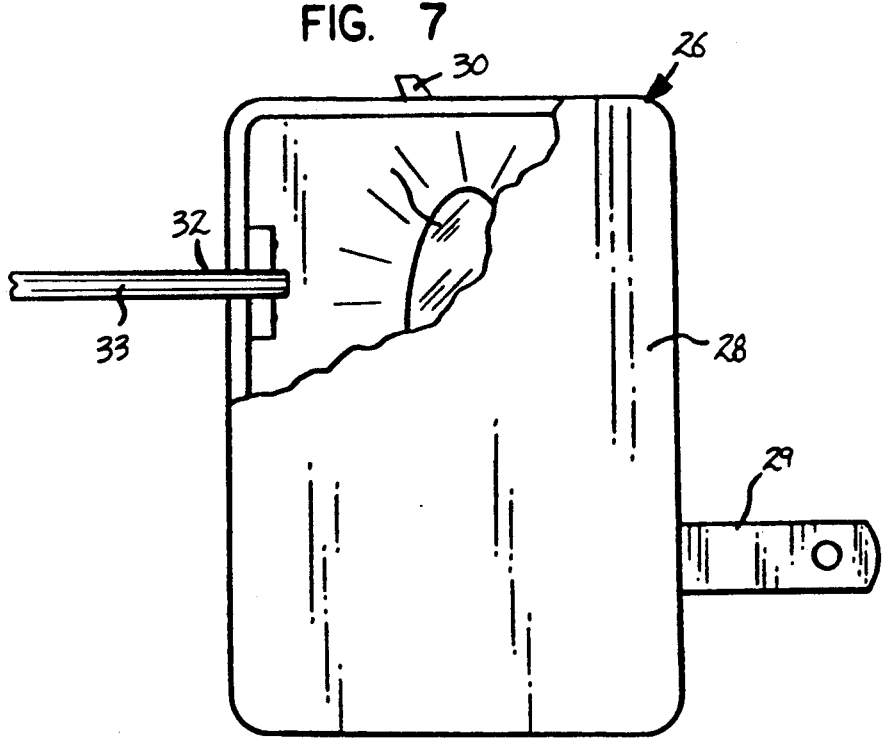
FIG. 7 is an orthographic view, taken in elevation and partially in section, of the illumination housing utilized by the instant invention.

More specifically, the illuminated commode training kit apparatus 10 essentially comprises a first and second respective flexible elongate longitudinally aligned mat 11 and 12, wherein each mat includes a plurality of rows of luminescent outlined footprints 13, wherein the rows are offset to simulate striding of an individual along the mat and each of the footprints arranged and directed forwardly in a like direction towards the forward end of each mat. A further component of the organization includes a flexible luminescent ring 14, including an interior annular surface 15 and an exterior annular surface coaxial with the interior surface. A peel-away first adhesive strip 17 and a second peel-away adhesive strip 18 are formed coextensively to bottom surfaces of the first and second flexible mats to permit securement of the mats onto a floor surface 25, in a manner as illustrated in FIG. 4. A third adhesive strip 16 is mounted coextensively to the interior annular surface 15 of the ring 14 to permit securement of the ring 14 about an associated commode 24, as illustrated in FIG. 4. Further, a luminescent frame 19 includes a fourth peel-away adhesive strip 20 to permit framing of an associated tissue paper dispenser roll 21 mounted to a support wall 22.

FIG. 5 illustrates a modified illuminated commode training kit 10a utilizing modified first and second flexible mat structure 111 and 112 resepctively. Included is a modified ring 114 and a modified frame 119. The components utilize the peel-away adhesive strips for securement to a support surface, in a manner as noted above, but further include in lieu of a luminescent film or paint layer, a fiber optic network to effect selective illumination of the organization. A modified ring 114 and a modified frame 119 are each formed of a transparent flexible material, wherein the flexible mats 111 and 112 may be formed of an opaque material, in a manner to be described in more detail below. A light source 26 (see FIG. 7 for example) is mounted to a convenient electrical receptacle 27 and includes a housing 28, with the mounting bracket 29 extending orthogonally and laterally thereof to permit attachment to the associated support wall 22. Switch member 30 provides selective actuation of the illumination bulb 31 mounted within the housing 28. The housing aperture 32 fixedly secures a first fiber optic cable portion 33 at a rear terminal end thereof in alignment with the illumination bulb 31 to direct illumination throughout the fiber optic cable network utilized by the instant invention. FIG. 5 illustrates the first fiber optic cable portion 33 directed into the modified frame 119 and imbedded medially throughout the frame 119, as illustrated in FIG. 5. A second fiber optic cable portion 35 is directed from the modified frame 119 and directed into the first modified elongate mat 111 and in series, directed to the second elongate mat 112. A third fiber optic cable portion 35 is directed from the second mat 112 into the modified ring 114 and the fiber optic cable is imbedded medially of the ring 114 for subsequent securement about the commode seat 24.

Figure 8:
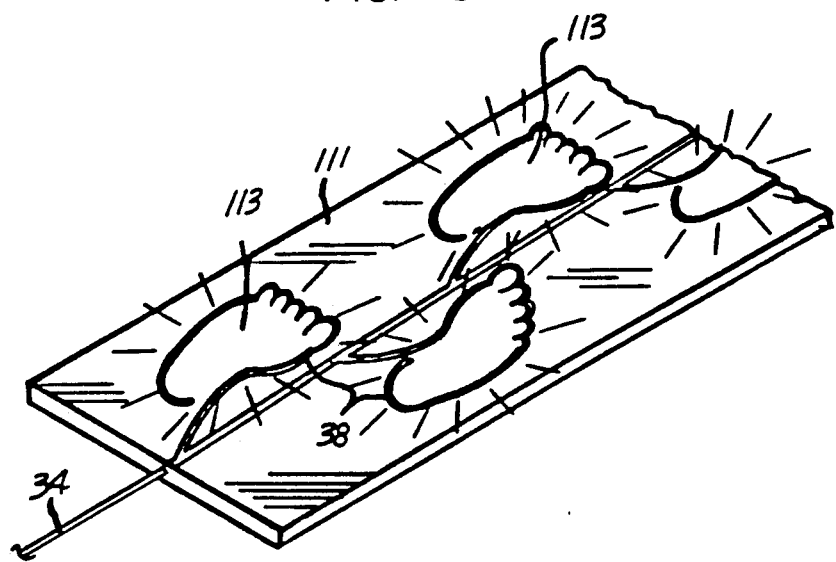
FIG. 8 is an isometric illustration of the illuminated mat structure utilized by the instant invention as set forth in FIG. 5.
Figure 9:
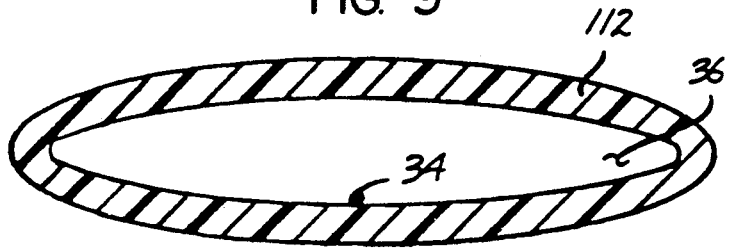
FIG. 9 is an orthographic cross-sectional view of the mat structure, as illustrated in FIG. 8.
Figure 10:
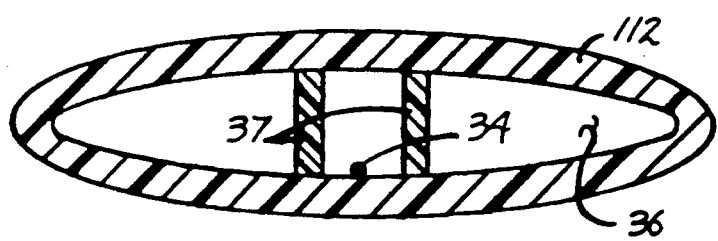
FIG. 10 is a modified mat structure of a type as illustrated in FIG. 8.

FIG. 8 illustrates the typical association of the second fiber optic cable portion 34 within the respective first and second modified flexible mats 111 and 112. The fiber optic cable is directed therethrough and each include a fiber optic footprint cable portion 113 mounted adjacent an upper surface of each mat to provide the spaced footprint configurations, as illustrated in FIG. 8. Each flexible mat includes a pneumatic chamber 36 therewithin to protect the associated fiber optic cable portion 35 directed therethrough. Further, if required, a plurality of spaced parallel ribs coextensive with and longitudinally aligned relative to the mat structures 111 and 112 may be formed to each side of the second fiber optic cable portion 34 to provide enhanced protection to the third cable portion 34 to effect enhanced and protected usage of the mat construction as set forth.

As to the manner of usage and operation of the instant invention, the same should be apparent from the above disclosure, and accoringly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illuminated commode training kit comprising, at least one flexible elongate mat, the flexible elongate mat including a top surface, the top surface including a plurality of spaced rows of outlined footprint members, the footprint members of adjacent rows offset relative to one another, and
a flexible ring, the flexible ring including an interior annular surface, and the flexible ring arranged for securement about a commode seat, and
a frame member, the frame member arranged for securement to a support wall surface about an associated tissue paper dispensing roll member, and
the footprint members, the flexible ring, and the frame including lighting means for providing enhanced visual lighting.

2. A training kit as set forth in claim 1 including a first adhesive strip mounted to a bottom surface of the flexible mat to permit securement of the flexible mat to a support floor, and a second adhesive strip coextensive with and mounted to the interior annular surface of the flexible ring to permit securement of the annular ring to the commode seat, and a third peel-away adhesive strip mounted to a rear surface of the frame to permit securement of the frame to the support wall.

3. A training kit as set forth in claim 2 wherein the flexible ring and the frame are transparent.

4. A training kit as set forth in claim 3 wherein the lighting means include a light source, the light source including a housing, the housing arranged for electrical communication with an electrical source, and the housing including a switch member mounted to the housing, and an illumination bulb mounted interiorly of the housing, the switch member arranged for selective actuation of the illumination bulb, and the housing including a housing aperture, and a first fiber optic cable mounted within the housing aperture in alignment with the illumination bulb, and the first fiber optic cable portion directed from the housing to the frame and directed coextensively throughout the frame, and a second fiber optic cable portion directed from the frame to the flexible elongate mat, and a third fiber optic cable portion directed from the mat to the flexible ring, the third fiber optic cable portion directed coextensively throughout the ring.

5. A training kit as set forth in claim 4 wherein the mat includes a pneumatic chamber directed coextensively therethrough, and the footprint members including a fiber optic footprint cable directed from the second fiber optic portion to each footprint member to provide an outline of each footprint member by the fiber optic footprint cable.

6. A training kit as set forth in claim 5 wherein the mat includes a plurality of spaced parallel ribs coextensively directed medially of the mat and wherein the second fiber optic cable portion is positioned medially of the ribs to provide enhanced protection of the second fiber optic cable portion within the mat.

7. A training kit as set forth in claim 6 including a further flexible elongate mat, with the second fiber optic cable portion directed from the flexible elongate mat to the further mat.

* * * * *